United States Patent [19]

Isobe et al.

[11] Patent Number: 5,154,550
[45] Date of Patent: Oct. 13, 1992

[54] THROW-AWAY TIPPED DRILL BIT

[75] Inventors: Kazutaka Isobe; Kazuo Noguchi; Toshio Nomura, all of Hyogo, Japan

[73] Assignee: Sumitomo Electric Industries, Ltd., Osaka, Japan

[21] Appl. No.: 860,102

[22] Filed: Mar. 30, 1992

Related U.S. Application Data

[63] Continuation of Ser. No. 658,210, Feb. 19, 1991, abandoned.

[30] Foreign Application Priority Data

Feb. 20, 1990 [JP] Japan .................................. 2-40644
Feb. 20, 1990 [JP] Japan .................................. 2-40645

[51] Int. Cl.$^5$ ...................... B23B 27/16; B23B 51/00; B23B 27/20
[52] U.S. Cl. ...................... 408/144; 407/50; 407/110; 407/119; 408/145; 408/231; 408/713
[58] Field of Search .................. 407/50, 110, 119; 408/144, 145, 231-233, 713

[56] References Cited

U.S. PATENT DOCUMENTS

| 3,540,323 | 11/1970 | Rishel . | |
|---|---|---|---|
| 4,231,762 | 11/1980 | Hara et al. | 51/307 X |
| 4,375,517 | 3/1983 | Watanabe et al. | 51/307 X |
| 4,527,931 | 7/1985 | Sarin | 407/113 |
| 4,744,704 | 5/1988 | Galvefors | 408/144 |
| 4,909,677 | 3/1990 | Noguchi et al. | 407/119 X |
| 4,950,557 | 8/1990 | Nakai et al. | 51/293 X |

FOREIGN PATENT DOCUMENTS

| 0081775 | 6/1983 | European Pat. Off. . | |
| 0118806 | 9/1984 | European Pat. Off. . | |
| 0184223 | 6/1986 | European Pat. Off. . | |
| 0257439 | 3/1988 | European Pat. Off. . | |
| 0319926 | 6/1989 | European Pat. Off. . | |
| 0322214 | 6/1989 | European Pat. Off. . | |
| 58-143115 | 9/1983 | Japan . | |
| 122785 | 7/1985 | Japan | 408/145 |
| 1164701 | 7/1986 | Japan | 408/1 R |
| 2094211 | 4/1987 | Japan | 408/145 |
| 62-218010 | 9/1987 | Japan . | |
| 62-46489 | 12/1987 | Japan . | |
| 62-292307 | 12/1987 | Japan . | |
| 63-38501 | 2/1988 | Japan . | |
| 63-38502 | 2/1988 | Japan . | |

OTHER PUBLICATIONS

Japanese Industrial Standard "Chormium Molybdenum Steels"; No.: JIS G 4105-1979.
Japanese Industrial Standard "Carbon Tool Steels" No.: JIS G 4401-1983.
Japanese Industrial Standard "High Speed Tool Steels" No.: JIS G 4403-1983.
Japanese Industrial Standard "Alloy Tool Steels" No.: JIS G 4404-1983.

Primary Examiner—Steven C. Bishop
Attorney, Agent, or Firm—W. G. Fasse; D. H. Kane, Jr.

[57] ABSTRACT

A drill bit has a throw-away drill bit tip in the form of an insert (21, 31) secured to a shank (22, 32) to be mounted in a drilling tool. The insert (21, 31) is disengageably mechanically connected with the shank (22, 32) without any screws. At least a cutting edge of the insert (21, 31) is made of a diamond or cubic boron nitride sintered body, and the shank (22, 32) is made of steel. Due to this structure, the insert (21, 31) has an excellent wear resistance and an adhesion resistance. The shank (22, 32) has sufficient toughness against breakage. Such a drill bit does not require any resharpening for continuous use during bit life.

14 Claims, 5 Drawing Sheets

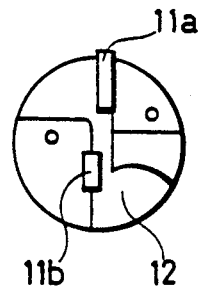
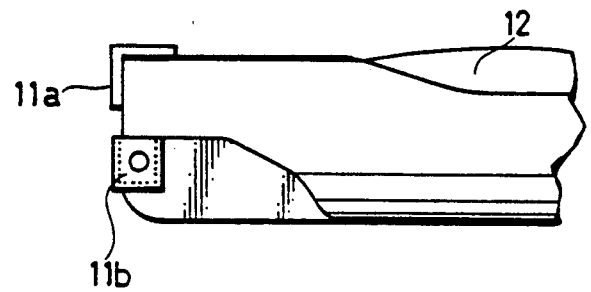
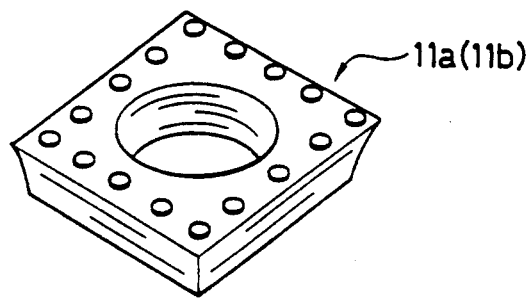
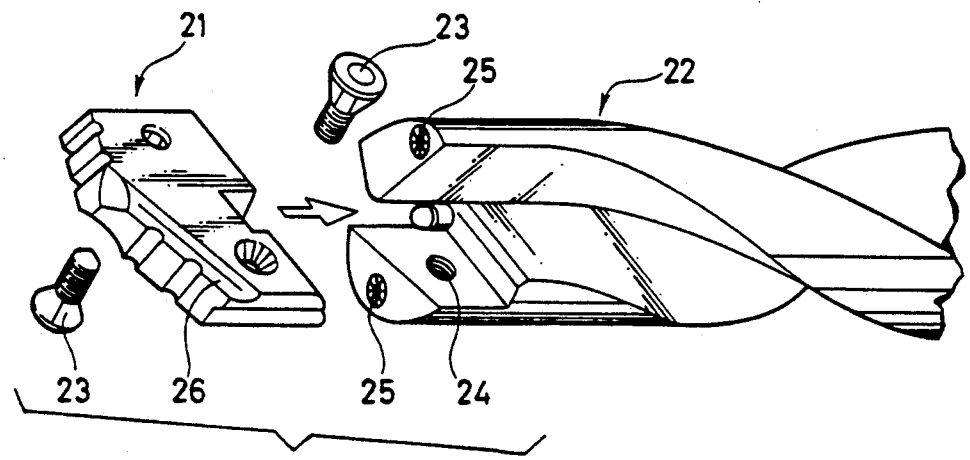

THROW-AWAY TIPPED DRILL BIT

This application is a continuation of application Ser. No.: 07/658,210, filed on: Feb. 19, 1991, now abandoned.

CROSS-REFERENCE TO RELATED APPLICATION

The present application is related to copending application U.S. Ser. No.: 07/649,615, filed on Feb. 1, 1991, now abandoned.

FIELD OF THE INVENTION

The present invention relates to the structure of a drill bit which is mainly adapted to drilling steel, cast iron or super alloy, and more particularly, it relates to the structure of a high-quality throw-away tipped drill bit, which is excellent in wear resistance and toughness.

BACKGROUND INFORMATION

A drill bit is a rotating cutting tool for drilling steel products and the like. FIG. 1 shows an exemplary structure of a conventional twist drill bit. The twist drill bit is formed by a cutting portion 1 which is applied to drilling, and a shank 2 which is adapted to discharge chips and is held in a chuck etc. of a cutting machine such as a drilling machine.

In general, materials for drill bits are prepared from high-speed steel and cemented carbide. The high-speed steel, which is excellent in toughness but inferior in wear resistance, is improper for high-speed cutting. On the other hand, cemented carbide, which is excellent in wear resistance and tool accuracy characteristics but brittle, may cause breakage when the same is applied in a machine tool having a low rigidity, for example.

In order to improve such materials, there has been proposed a structure attained by coating a cutting portion of high-speed steel with hard TiN, a structure attained by brazing a cutting portion of cemented carbide, and the like.

In recent years, there has further been proposed a structure attained by brazing different cemented carbide materials (P30 and D30) for improving the wear resistance and toughness as disclosed in Japanese Utility Model Laying-Open No. 58-143115 (1983), or by metallurgically integrating/connecting such different materials as disclosed in Japanese Utility Model Publication No. 62-46489 (1987). A drill bit having a double structure with central and outer peripheral portions has been made of different cemented carbide materials in consideration of the differences between the characteristics required for such drill bit portions, as disclosed in Japanese Patent Laying-Open No. 62-218010 (1987). A method of attaining such a double structure by injection molding has been disclosed in Japanese Patent Laying-Open No. 63-38501 or 38502 (1988). There has also been proposed a structure attained by preparing a material for a drill bit from cermet Ti-base cemented carbide in order to improve the adhesion resistance, as disclosed in Japanese Patent Laying-Open No. 62-292307 (1987).

A cutting portion and a shank of a drill bit are exposed to different load conditions during drilling. Therefore, different material characteristics are required for the respective parts or portions of such a drill bit. For example, wear resistance and adhesion resistance are required for a tip of the cutting portion, while toughness for maintaining strength of the tool is required for the shank. As to the tip of the cutting portion, different characteristics are required for central and outer peripheral portions thereof, since these portions are driven at different cutting speeds.

When a drill bit with a coated cutting portion for meeting the complicated requirements for the material characteristics, is resharpened for general use, the coating layer is inevitably separated at least from a front flank side, and hence most of the coating effect is lost.

On the other hand, a drill bit which is formed by brazing cemented carbide to its cutting portion, cannot be used for deep hole drilling of a hard to cut material. If the shank is made of steel, a significant difference between the thermal expansion coefficients of the steel and of the cemented carbide forming the cutting portion, exists whereby splitting or cracking may easily be caused during brazing.

In recent years, a cemented carbide material for the shank of a drill bit, has been brought into a coarse grain or high binder phase state, in order to improve the toughness of the shank. However, the strength of the material is reduced by distortion of the elastic limit. Hence, the shank has a tendency to break during perforating, or due to vibration of a workpiece, an unstable rotation of a cutting machine or the like.

While a drill bit formed by inseparably and integrally connecting the cutting portion and the shank, can be repeatedly used by resharpening the cutting portion after a prescribed operating time, the number of such resharpenings is limited, and production costs are increased. Further, sharpness and the tool life of such bits are non-uniform depending on conditions under which the resharpening is performed. In addition, it is necessary to successively and correctly ascertain the length of the resharpened drill bit if the bit is used in a numerically controlled and automated cutting machine tool. Thus, the length of the drill bit must be measured by a complicated operation every time the same has been resharpened.

SUMMARY OF THE INVENTION

It is an object of the invention to solve the aforementioned problems, by providing a drill bit with a throw-away insert forming a drill bit which has an excellent wear resistance, an adhesion resistance, and a shank which has sufficient toughness against breakage, which does not require resharpening for continuous use during the life of the drill bit.

In order to attain the aforementioned object, the present drill bit with a throw-away tip comprises a tip insert for cutting a workpiece and a shank to be mounted in a prescribed position of a cutting machine, wherein the insert is disengageably mechanically connected with the shank. At least a cutting edge of the insert is formed of a diamond sintered body, and the shank is made of steel.

The diamond sintered body forming at least the cutting edge of the insert preferably contains diamond in a range of at least 70 volume percent and not more than 99 volume percent.

The entire insert body need not be formed of a diamond sintered body, rather, a diamond sintered body forming the cutting edge may be bonded onto a base of cemented carbide. Further, only the cutting edge of the insert may be formed of a diamond sintered body or a material prepared by bonding a diamond sintered body onto a base of cemented carbide, and the base is then connected by brazing with the remaining portion of the insert, which is made of cemented carbide. In other words, at least the cutting edge of the insert must be formed of a diamond sintered body.

Characteristics required for a drill bit are roughly classified into wear and adhesion resistance for an insert, and breakage resistance, which is provided by the toughness of a shank. According to the present invention at least the cutting edge of the insert is formed of a diamond sintered body, whereby the insert is improved in wear resistance, adhesion resistance and toughness, because diamond is extremely hard and has an excellent high thermal conductivity as compared with WC and $Al_2O_3$, which are generally employed as main components for tool materials. A diamond sintered body is also excellent in toughness. Thus, the present drill bit is suitable for cutting materials such as cemented carbides, an Al alloy containing a large amount of Si, ceramics, a copper alloy, carbon, and the like.

At least the cutting edge of the diamond sintered body forming the insert, preferably contains diamond in a range of at least 70 volume percent and not more than 99 volume percent since it is impossible to sufficiently improve the wear resistance if the diamond content is less than 70 volume percent, while the degree of sintering deteriorates if the content exceeds 99 volume percent.

The shank, which is made of steel, has an excellent toughness and breakage resistance. Further, the material costs have been reduced.

In the drill bit according to the present invention, the insert and the shank are disengageably mechanically connected with each other, whereby it is possible to easily disengage and throw away the insert, when it has been worn out.

In another aspect of the present invention, the drill bit comprises an insert of which at least the cutting edge is formed of a cubic boron nitride sintered body, and the shank is made of steel.

The cubic boron nitride sintered body forming at least the cutting edge of the insert preferably contains cubic boron nitride in a range of at least 40 volume percent and not more than 80 volume percent.

The insert need not be formed entirely of a cubic boron nitride sintered body, but at least the cutting edge must be made of cubic boron nitride, whereby a cubic boron nitride sintered body forming the cutting edge or a portion of the insert including the cutting edge is bonded onto a base of cemented carbide.

The remaining portion of the insert, which is made of cemented carbide, is connected to the cutting edge or cutting edge portion by brazing. In other words, at least the cutting edge of the insert may be formed of a cubic boron nitride sintered body.

The insert and the shank of the present drill bit are connected with each other by a self-grip connection to be described below.

By forming at least the cutting edge of the insert as a cubic boron nitride sintered body, the wear resistance, the adhesion resistance, and the toughness are improved, because cubic boron nitride is extremely hard and has an excellent thermal conductivity as compared with WC and $Al_2O_3$, which are generally employed as main components for tool materials. A cubic boron nitride sintered body is also excellent in toughness. Further, such an insert formed as cubic boron nitride sintered body can be used for drilling ferrous materials, particularly very hard steel such as hardened steel, since the insert does not contain any carbon. In addition, the cubic boron nitride sintered body is also capable of cutting an Ni-group or Co-group heat resistant alloy, which is regarded as a hard to cut material, and a ferrous sintered component.

The cubic boron nitride sintered body which is employed as a material for the insert, preferably contains cubic boron nitride in a range of at least 40 volume percent and not more than 80 volume percent since it is impossible to sufficiently improve the wear resistance if the content is less than 40 volume percent. The continuity between particles of cubic boron nitride structurally deteriorates if the CBN content exceeds 80 volume percent, whereby the toughness is reduced.

The present inserts have an excellent wear resistance, adhesion resistance, and thermal cracking resistance or chipping resistance. The shank has an excellent toughness. The costs have been reduced. Thus, it is possible to provide a drill bit with a throw-away tip having a high reliability, a long life, and a high quality. Chipping of the insert and abrupt breakage of the shank are avoided at a low cost. The insert exchange is easy and resharpening is not required for a continuous use during the life of the insert, whereby the drill bit length remains constant and sharpness is maintained during a prolonged bit life. Repeated length measurements are avoided.

The blank for the insert can be formed by injection molding, whereby it is possible to easily form a chip breaker or the like, to further reduce the working cost.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2A is a front elevational view showing a two-flute screwed throw-away tipped drill bit of the present invention;

FIG. 2B is a right side elevational view of the drill bit shown in FIG. 2A;

FIG. 2C is a perspective view on an enlarged scale showing an insert for use in FIGS. 2A and 2B;

FIG. 3 is an exploded perspective view showing a throwaway tipped drill bit of the invention with a two-flute screwed system;

DESCRIPTION OF THE PREFERRED EMBODIMENTS

Figure 1:
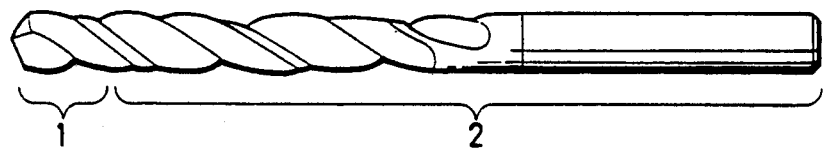
FIG. 1 is a structural diagram showing a conventional twist drill bit.

Examples of the present invention are now described.

An insert and a shank of the throw-away tipped drill bit according to the invention are connected with each other without screws as shown in FIGS. 4, 5A, 5B, 6A, 6B and 7. FIGS. 2A to 2C show a two-flute throw-away tipped drill bit, wherein inserts 11a and 11b are fixed by screwing to outer and inner peripheral portions of a forward end of a shank 12 respectively. FIG. 3 shows a typical example of a throw-away tipped drill bit of a two-flute system, wherein an insert 21 is fitted in a shank 22 as shown by an arrow. The insert 21 is fixed by a screw 23 in a screw hole 24. A coolant supply hole 25 directly supplies a coolant to the tip of the insert 21. Further, a chip breaker 26 is provided on the cutting edge of the insert 21 for separating chips.

Figure 4:
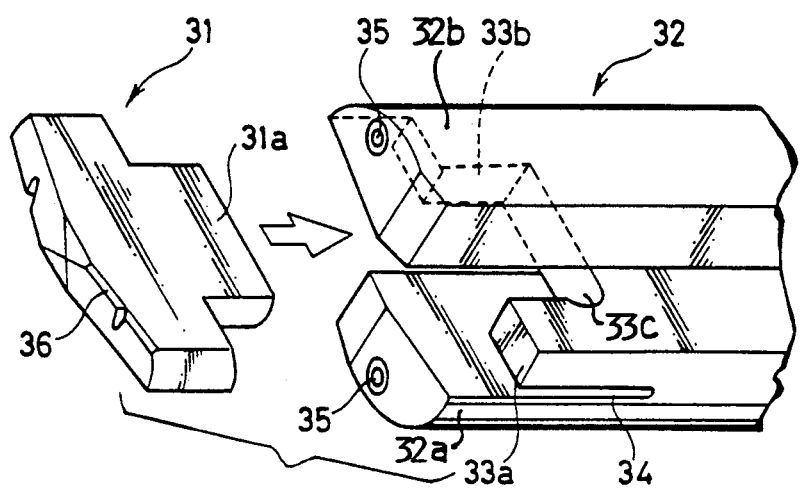
FIG. 4 shows, on an enlarged scale an exploded perspective view showing a connection part and insert of a self-grip type drill bit of the invention.
Figure 5A:
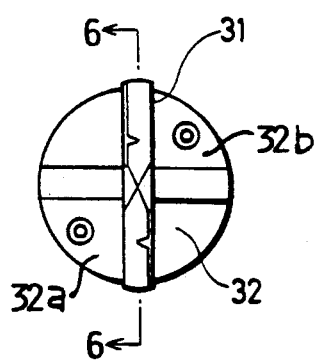
FIG. 5A is a front elevational view of the assembled drill bit shown disassembled in FIG. 4.
Figure 5B:
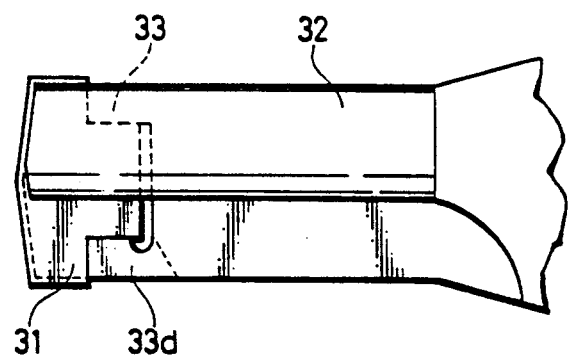
FIG. 5B is a right side elevational view of the assembled bit.

In a drill bit shown in FIGS. 4, 5A and 5B, an insert 31 is fitted in a shank 32 as indicated by an arrow shown in FIG. 4, so that the insert 31 and the shank 32 are connected with each other without any screw or the like, in a so-called self-grip connection shown in FIGS. 5A and 5B. In this self-grip connection side walls of a held portion 31a of the insert 31 are brought into contact with inner end surfaces of holding portions 33a and 33b of the shank 32 with a frictional force fit, whereby the insert 31 is fixed to the shank 32.

At least one of the holding portions 33a and 33b is able to elastically yield radially outwardly relative to a central longitudinal axis of the shank 32 by reason of a slit 34 extending axially between the holding portion 33a and a rigid axially A corresponding slit not shown may be provided between the holding portion 33b and a rigid axially extending shank section 32b.

Figure 6A:
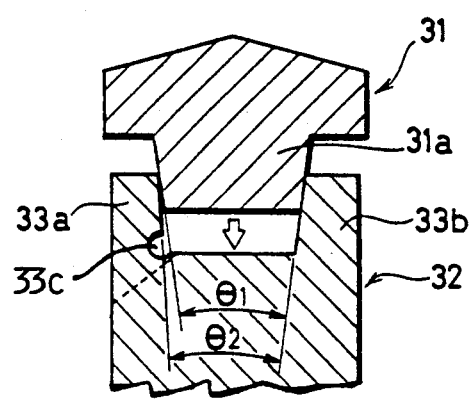
FIG. 6A is a sectional view taken along the line 6 - 6 in FIG. 5A, for illustrating an initial press fitting of an insert into a shank.
Figure 6B:
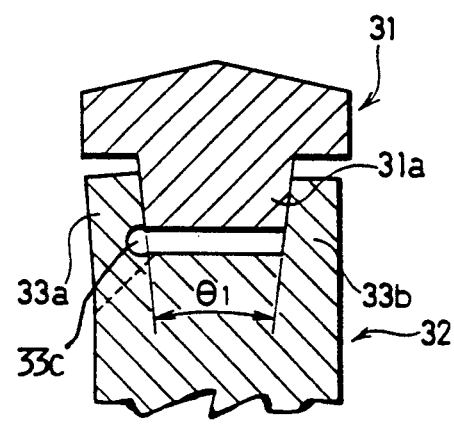
FIG. 6B is a sectional view similar to that of FIG. 6A but illustrating the completion of the press fitting.

With reference to FIGS. 6A and 6B, the state of such connection of the insert 31 with the shank 32 caused by engagement therebetween is explained as follows: Before the insert 31 is engaged with the shank 32, an angle $\theta_1$ formed by the left and right side walls of the held portion 31a is slightly greater than an angle $\theta_2$ formed by the opposite inner end surfaces of the holding portions 33a and 33b. When the insert 31 is press-fitted in the shank 32, the angle $\theta_2$ is gradually expanded by wedge action due to tapering of the left and right side walls of the held portion 31a and due to the slit 34 provided on the holding portion 33a as shown in FIG. 4. When $\theta_1 > \theta_2$, the held portion 31a is in contact with the holding portion 33b only at an upper end of the inner end surface of the holding portion 33a. When $\theta_2$ reaches $\theta_1$, the contact areas between both side walls of the held portion 31a and the inner end surface of the holding portion 33a, are maximized as shown in FIG. 6B. The press fitting operation is stopped in this state, and the holding portion 33a is elastically deformed to cause a pressing force in the contact surfaces of the holding portions and the held portion 31a, so that the insert 31 is connected with or fixed to the shank 32 by frictional force between the contact surfaces.

At least one coolant supply hole 35 shown in FIG. 4 directly supplies a coolant to the cutting edge of the insert 31. Further, a chip breaker 36 is provided on the cutting edge of the insert 31, in order to part chips also as shown in FIG. 3 at 25.

Figure 7:
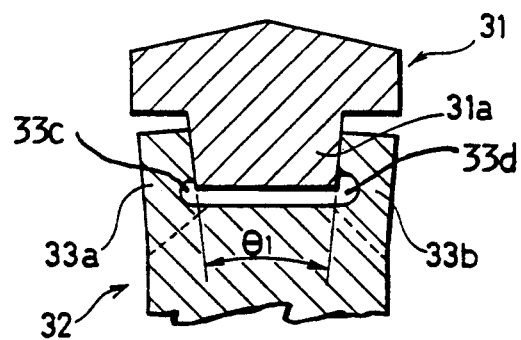
FIG. 7 is a sectional view illustrating another example embodiment of an insert connection part provided with slits on both sides of the holding portions of the connection part.

FIG. 7 shows another example of a shank 32, which is provided with two slits 34, as shown in FIG. 4, not only in a holding portion 33a, but also in another holding portion 33b. In this case, an insert 31 is press-fitted in the shank 32 so that both holding portions 33a and 33b are simultaneously expanded, thereby holding a held portion 31a by an elastic force. FIG. 7 also shows a second cut-back groove 33d mirror-symmetrical relative to the groove 33c and relative to a central longitudinal axis of the shank 32, whereby a symmetrical elastic expansion of the holding portions 33a, 33b is assured.

The just described throw-away tipped drill bit according to a first Example of the present invention, is formed by making the insert 31 of a material obtained by bonding a diamond sintered body onto a base of cemented carbide which is disengageably mechanically connected with a shank 32 made of steel as shown in FIG. 4.

Table 1 shows composition values of various powder materials for diamond sintered bodies forming insert samples A, B, C, and D of the invention and comparative samples E and F. Table 1 also shows steel materials for shanks of the inventive and comparative samples. The samples A, B, C, and D and the comparative samples E and F shown in Table 1, have the inserts connected to the shanks as shown in FIG. 4.

Sample D of the present samples A to D is substantially within the scope of the present invention, but the content (volume percent), shown by marks **, of diamond is considerably below a preferable range. The material for the insert of the comparative sample E is out of the scope of the present invention since the cutting edge of its insert is formed of coated cemented carbide. In the comparative sample F, the material of the cutting edge of the insert is made of $Si_3N_4$, which is out of the scope of the present invention. Symbol * shows materials which are out of the scope of the present invention.

TABLE 1

| Sample | Composition of Insert (vol. %) | Shank |
|---|---|---|
| Example of the Invention | | |
| A | Diamond Powder (92), WC(7), Co (1) | SCM435 |
| B | Diamond Powder (88), WC (containing 15 wt. % of Co) | SKS2 |
| C | Diamond Powder (93), TiC (5), Co (2) | SKH51 |
| D | **Diamond Powder (65), WC (30), Co (5) | SCM435 |
| Comparative Example | | |
| E | Cutting Edge: Coated Cemented Carbide (P30-Grade Cemented Carbide Coated with TiN Film) | SCM435 |
| F | *Cutting Edge: $Si_3N_4$ Ceramics | SCM435 |

SCM435 Chromium Molybdenum Steels According to Japanese Industrial Standard (JIS G 4105-1979)
SKS2 Alloy Tool Steels (JIS G 4404 - 1983)
SKH 51 High Speed Tool Steels (JIS G4403-1983)

Performance evaluation tests for the aforementioned samples were made on drill bits having a diameter of 8 mm, under the following conditions:
  Workpiece: AC4C
  Cutting Speed: 120 m/min., dry type (water-soluble cutting oil)
  Feed Rate: 0.10 mm/rev.
  Depth of Cut: 25 mm Criterion: Tip conditions etc. were observed after working up to end of life.

Life: Generally regarded as ended when the outer peripheral flank was worn by at least 0.2 mm.

Table 2 shows the results of the aforementioned performance evaluation tests. Excellent results were obtained for samples A to C of the invention as compared with comparative samples E and F. The present sample D, the number of drilled holes that could be drilled is lower than for samples A, B, and C. The depth of adhesive wear of the inner peripheral face was increased for sample D with respect to the same amount of outer peripheral front flank abrasion, since the amount of diamond contained in the diamond sintered body forming the insert was less than the preferable range of 70 to 99 volume percent.

TABLE 2

| Sample | Number of Worked Holes | Abrasion of Outer Peripheral Front Flank (mm) | Depth of Adhesive Wear of Inner Peripheral Face (mm) |
| --- | --- | --- | --- |
| Sample of the Invention | | | |
| A | 3500 | 0.2 | 0.01 |
| B | 4300 | 0.2 | 0.01 |
| C | 4700 | 0.2 | 0.01 |
| D | 1520 | 0.2 | 0.10 |
| Comparative Sample | | | |
| E | 840 | 0.2 (significantly chipped) | 0.15 |
| F | 1210 | test stopped due to cutting edge chipping | |

A second Example of the present invention will now be described.

The samples of throw-away tipped drill bits of the second example of the invention were formed by inserts and shanks of the same materials as those for the sample A of the first Example, to compare cutting characteristics of three types of connection systems. The self-grip drill bit shown in FIGS. 4 to 7 corresponds to sample G. The two-flute screwed drill bit shown in FIGS. 2A to 2C corresponds to sample H. The two-flute drill bit shown in FIG. 3 corresponds to sample I. A comparative sample of a brazed drill bit having an insert of cemented carbide, which was out of the scope of the present invention corresponds to Sample J. The cutting conditions were as follows:

Workpiece: AC4C
Cutting Speed V: 50 m/min. and 150 m/min. (water-soluble cutting oil)
Feed Rate: 0.1 mm/rev.
Depth of Cut: 40 mm
Diameter of Worked Hole: 20 mm Table 3 shows the results of the evaluated characteristics.

Cutting characteristics, represented by stability, can be regarded excellent since horizontal load components, thrust and torque load values of a cutting balance acting on the drill bits by the cutting resistance are reduced and the values depending on speed are also reduced.

From the results obtained for the samples of the invention, it is understood that the self-grip system of the sample G attained the most excellent cutting characteristics among the connection systems for the present throw-away tipped drill bits.

TABLE 3

| | | Compared Characteristics | | | | | | |
| --- | --- | --- | --- | --- | --- | --- | --- | --- |
| | | Cutting Balance (Horizontal Component) (N) | | Thrust (N) | | Torque (J) | Hole Diameter Over Size (μm) | |
| | | Cutting Speed V (m/min.) | | | | | | |
| | Sample | 50 | 150 | 50 | 150 | 50 | 150 | Remarks |
| Example of the Invention | | | | | | | | |
| G | Self-Grip Type | 100 | 90 | 1200 | 1200 | 1500 | 30 | Throw-Away Type Shown in FIG. 4. |
| H | Two-Flute Screwed Type with two inserts | 800 | 320 | 1600 | 1600 | 1750 | 200 | Throw-Away Type Shown in FIG. 2A to 2C |
| I | Two-Flute Screwed Type with One Insert | 240 | Unmeasurable | 5200 | Unmeasurable | 2050 | 35 | Throw-Away Type Shown in FIG. 3. Insert Departed at V = 150 |
| Comparative Example | | | | | | | | |
| J | Brazed Type with Cutting Edge of Cemented Carbide | 80 | Unmeasurable | 2000 | Unmeasurable | 2900 | 30 | Helical Flute, Cross Thinning, Resharpening Available 5 Times. Incapable of Parting Chips and Broken at V = 150 |

(Note) Materials for inserts and shanks of present samples G, H and I are identical to those of sample A in Table 1.

The self-grip type throw-away tipped drill bit shown in FIGS. 4 to 7 was embodied in sample G of the invention, whereby the insert is fixed to the shank through elastic force exerted by the steel shank, which is provided with at least one slit 34 in the shank as described above. Thus, this drill bit requires no separate fastener means such as screw means. Therefore, it is possible to manufacture for the first time a drill bit with a throw-away tip having a diameter exceeding 10 mm, which has not been implemented by conventional screw mountins due to an inferior fastening strength, causing breaking of the mounting screws and the like. Further, the use of the present drill bits is improved since no screwing is required for connecting the insert to the shank in the work place. Rather, the drill bit can be assembled by simply press-fitting the insert into the shank.

Example 3 of the present invention will no be described.

A drill bit with a throw-away insert according to the third Example of the present invention is formed by preparing an insert from a material obtained by bonding a cubic boron nitride sintered body onto a base of cemented carbide and disengageably mechanically connecting the insert with a shank of steel as shown in FIGS. 4 to 7.

Table 4 shows composition values of various powder materials for cubic boron nitride sintered bodies forming inserts of the invention and comparative samples. Table 4 also shows steel materials for shanks of the invention and comparative samples. In all the samples shown in Table 4, the inserts and shanks are connected with each other as shown in FIG. 4. Samples N and 0 of the samples K to 0 are substantially within the scope of the present invention but the contents (volume percent), shown by marks **, of cubic boron nitride power materials are out of the preferred range of 40 to 80 volume percent. The comparative sample P is out of the scope of the invention because its shank is made of K30-grade cemented carbide, althouth its insert is formed of a cubic boron nitride sintered body.

TABLE 4

| Sample | Composition of Insert (vol. %) | Shank |
| --- | --- | --- |
| Sample of the Invention | | |
| K | Cubic Boron Nitride Powder (60)k TiC (40) | SCM435 |
| L | Cubic Boron Nitride Powder (75), TiN (25) | SKS2 |
| M | Cubic Boron Nitride Powder (55), WC (45) | SK2 |
| N | **Cubic Boron Nitride Powder (90), TiN (10) | SCM435 |
| O | **Cubic Boron Nitride Powder (35), TiN (40), WC (25) | SK2 |
| Comparative Sample | | |
| P | Cubic Boron Nitride Powder (60), TiC (40) | K30-Grade Cemented Carbide |

SCM435 Chromium Molybdenum Steels According to Japanese Industrial Standard (JIS G4105-1979)
SKS2 Alloy Tool Steels (JIS G 4404-1983)
SK2 Alloy Tool Steels (JIS G 4404-1983)

Performance evaluation tests for the aforementioned samples were made with drill bits of 12 mm in diameter, under the following conditions:

Workpiece: SNCM420 ($H_{RC}=50$)
Cutting Speed: 100 m/min., dry type (water-soluble cutting oil)
Feed Rate: 0.15 mm/rev.
Depth of Cut: 20 mm
Criterion: Tip conditions etc. were observed after working up to end of the tip life.
Life: Generally regarded as ended when the outer peripheral flank was worn by at least 0.2 mm.

Table 5 shows the results of the aforementioned performance evaluation tests. Excellent results were obtained for the samples K to M of the invention. The present samples N and 0 are somewhat inferior in wear resistance and chipping resistance since the contents of the cubic boron nitride in the sintered bodies forming the inserts are out of the preferred range of 40 to 80 volume percent with respect to bonding phases of cemented carbide. For the purpose of reference, similar experiments were made for four types of conventional drill bits as shown in the lower part of Table 5. It is understood from the results that the samples K to M of the invention are particularly superior compared to the reference samples.

TABLE 5

| Sample | Number of Worked Holes | Abrasion of Outer Peripheral Front Flank (mm) | Depth of Wear of Inner Peripheral Cutting Face (mm) |
| --- | --- | --- | --- |
| Sample of the Invention | | | |
| K | 2680 | 0.2 | 0.02 |
| L | 2410 | 0.2 | 0.03 |
| M | 2840 | 0.2 | 0.01 |
| N | 1200 | 0.2 (significantly chipped) | 0.02 |
| Comparative Samples | | | |
| O | 840 | 0.2 | 0.05 |
| P | 670 | test stopped due to shank breakage | |
| Reference Example | | | |
| Cutting Edge: Coated Cemented Carbide | 140 | 0.2 | 0.11 |
| Cutting Edge: Al$_2$O$_3$ | 460 | test stopped due to significant cutting edge chipping | |
| Integrated Coated High-Speed Steel | 0 | cutting edge extremely worn | |
| Integrated Coated Cemented Carbide | 66 | test stopped due to shank breakage | |

A fourth Example of the present invention will now be described.

In this Example, the present samples were formed by inserts and shanks of the same materials as those for the sample K of the third Example, to compare the cutting characteristics with regard to three types of connection for the self-grip drill bit shown in FIG. 4, sample Q. The two-flute drill bit shown in FIGS. 2A to 2C represents sample R. The two-flute drill bit shown in FIG. 3 represents sample S. A comparative sample of a brazed drill bit, having an insert of cemented carbide, which was out of the scope of the present invention is represented by sample T. The cutting conditions were as follows:

Workpiece: S50C, $H_B=220$
Cutting Speed V: 50 m/min. and 150 m/min. (water-soluble cutting oil)
Feed Rate: 0.2 mm/rev.
Depth of Cut: 40 mm
Diameter of Worked Hole: 20 mm Table 6 shows the results of the evaluated characteristics.

Cutting characteristics, represented by stability, can be regarded excellent since horizontal load components, thrusts and torque load values of a cutting balance acting on the drill bits by the cutting resistance are reduced and the values depending on speed are also reduced.

From the results obtained for the samples of the invention, it is understood that the self-grip system of the sample Q attained the most excellent cutting characteristics among the connection systems for the present throw-away tipped drill.

TABLE 6

| | | Compared Characteristics | | | | | | |
|---|---|---|---|---|---|---|---|---|
| | | Cutting Balance (Horizontal Component) (N) | | Thrust (N) | | Torque (J) | Hole Diameter Over Size (μm) | |
| | | Cutting Speed V (m/min.) | | | | | | |
| | Sample | 50 | 150 | 50 | 150 | 50 | 150 | Remarks |
| Samples of the Invention | | | | | | | | |
| Q | Self-Grip Type | 190 | 180 | 800 | 185 | 3300 | 20 | Throw-Away Type Shown in FIG. 4. |
| R | Two-Flute Screwed Type With Two Inserts | 1610 | 590 | 1980 | 2050 | 3800 | 200 | Throw-Away Type Shown in FIG. 2A to 2C |
| S | Two-Flute Screwed Type With One Insert | 400 | Unmeasurable | 7200 | Unmeasurable | 4200 | 30 | Throw-Away Type Shown in FIG. 3. Insert Departed at V = 150 |
| Comparative Sample | | | | | | | | |
| T | Brazed Type with Cutting Edge of Cemented Carbide | 150 | Unmeasurable | 2700 | Unmeasurable | 6200 | 20 | Helical Flute, Cross Thinning, Resharpening Available 5 Times. Incapable of Parting Chips and Broken at V = 150 |

(Note) Materials for inserts and shanks of present samples G, H and I are identical to those of sample A in Table 1.

Figure 8A:
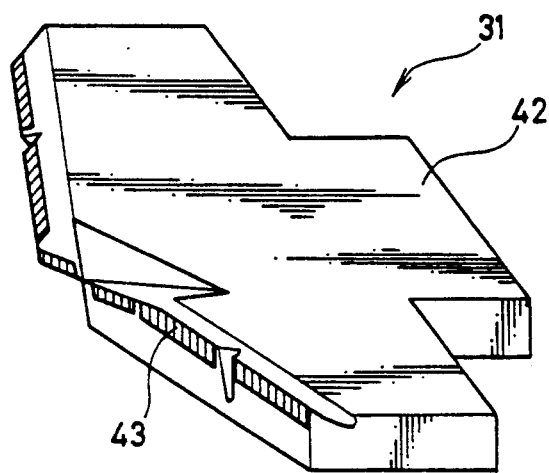
FIG. 8A is a perspective view showing an exemplary insert for drill bits of the invention, only the cutting edge of which is formed of a diamond or cubic boron nitride sintered body.
Figure 8B:
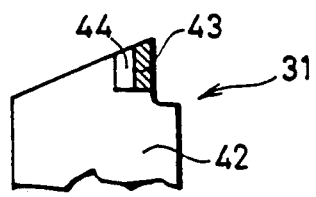
FIGS. 8B and 8C are sectional views illustrating two examples of a portion around the cutting edge shown in FIG. 8A.
Figure 8C:
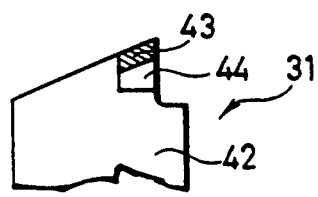
Figure 9:
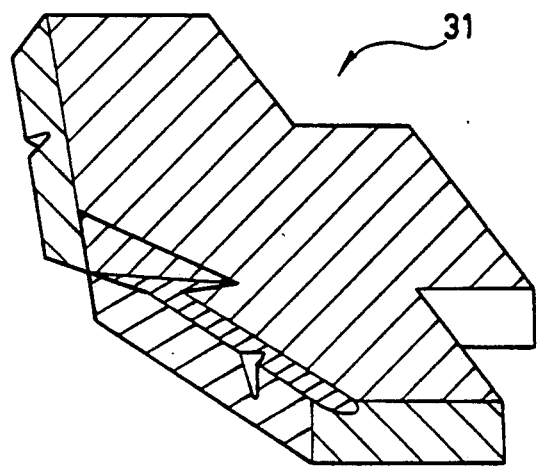
FIG. 9 is a perspective view showing an exemplary insert for drill bits of the invention having a surface entirely covered with a diamond film.

In first to fourth Examples, at least the cutting edge of each insert is made of a diamond or cubic boron nitride sintered body, specifically as shown in FIG. 8A. For example, an insert cutting edge 43 of a diamond or cubic boron nitride sintered body is attached to an insert base 42, which is made of cemented carbide or steel to form the insert 31. In order to attain such a structure, a cutting edge piece forming an insert tip 43 of a diamond or cubic boron nitride sintered body is connected to a tip base 44 of cemented carbide by brazing. The tip base 44 in turn is secured in a groove provided in the insert base 42 also by brazing as shown in FIGS. 8B and 8C.

With the present structure it is possible to use a hard diamond sintered body or cubic boron nitride sintered body as a material for making only the cutting edge of the insert for which high wear resistance and hardness are required and to use such a strong material as cemented carbide or steel as a material for the main body of the insert. These features prolong the life of the present drill bits.

It is also possible to attain a similar function or effect by making an insert 31 entirely of cemented carbide or ceramics and coating the overall surface thereof with a diamond film of less than 20 μm in thickness by vapor phase synthesis.

The method of manufacturing inserts wherein a diamond coating is applied is more preferable, because such inserts can be produced at a low cost by injection molding, whereby complicated figures can be easily formed.

As a result of a performance evaluation test under the same cutting conditions as the first embodiment, after drilling 3200 holes, the abrasion of the outer peripheral front flank was 0.2 mm with a slight chipping and the depth of wear of the inner peripheral cutting face was less than 0.01 mm, which was nearly equal with the samples A to C.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A drill bit having a longitudinal central rotational axis, comprising a shank made of steel and a throw-away insert forming a drill bit tip, and means for mounting said throw-away insert to a forward end of said steel shank, said mounting means comprising holding portions arranged symmetrically to said central rotational axis, means for enabling at least one of said holding portions to elastically yield radially relative to said central rotational axis for holding said throw-away insert with a frictional force fit in an axial direction, said steel shank comprising two axially extending shank sections contacting said throw-away insert for taking up torque moments, whereby said throw-away insert is elastically held in a self-grip manner without any screws.

2. The drill bit of claim 1, wherein said throw-away insert comprises at least a cutting edge made of a diamond sintered body.

3. The drill bit of claim 2, wherein said diamond sintered body contains diamond within the range of at least 70% by volume and 99% by volume at the most.

4. The drill bit of claim 2, wherein said diamond sintered body of said throw-away insert comprises, in addition to said diamond, at least one member selected from the group consisting of tungsten carbide (WC), titanium carbide (TiC), and cobalt (Co).

5. The drill bit of claim 1, wherein said steel shank comprises two of said holding portions (33a, 33b) and said insert comprises one of said holding portions, and wherein said means for enabling comprise at least one slit (34) in at least one of said inserts and said shank for producing an elastic gripping force when said insert holding portion engages said shank holding portions.

6. The drill bit of claim 1, wherein said throw-away insert comprises a base made of one of cemented carbide and steel, and an insert cutting edge (43) secured to said base, said cutting edge being made of a diamond sintered body.

7. The drill bit of claim 6, wherein said cutting edge (43) is brazed to said base.

8. The drill bit of claim 1, wherein said throw-away insert is made entirely of one of cemented carbide and ceramics, and wherein said throw-away insert comprises an overall surface coating film made of diamond.

9. The drill bit of claim 1, wherein said throw-away insert comprises at least a cutting edge made of a cubic boron nitride sintered body.

10. The drill bit of claim 9, wherein said cubic boron nitride sintered body contains cubic boron nitride within the range of at least 40% by volume and 80% by volume at the most.

11. The drill bit of claim 9, wherein said cubic boron nitride sintered body comprises, in addition to said cubic boron nitride, at least one member selected from the group consisting of titanium, carbide (TiC), titanium nitride (TiN), and tungsten carbide (WC).

12. The drill bit of claim 9, wherein said steel shank comprises two of said holding portions (33a, 33b) and said insert comprises one of said holding portions, and wherein said means for enabling comprise at least one slit (34) in at least one of said insert and said shank for producing an elastic gripping force when said insert holding portion engages said shank holding portions.

13. The drill bit of claim 9, wherein said throw-away insert comprises a base made of one of cemented carbide and steel, and an insert cutting edge (43) secured to said base, said cutting edge being made of a cubic boron nitride.

14. The drill bit of claim 13, wherein said cutting edge is brazed to said base.

* * * * *